US009116623B2

(12) United States Patent
Ashok et al.

(10) Patent No.: US 9,116,623 B2
(45) Date of Patent: Aug. 25, 2015

(54) OPTIMIZING STORAGE SYSTEM BEHAVIOR IN VIRTUALIZED CLOUD COMPUTING ENVIRONMENTS BY TAGGING INPUT/OUTPUT OPERATION DATA TO INDICATE STORAGE POLICY

(75) Inventors: Rohith K. Ashok, Apex, NC (US);
Darryl E. Gardner, Durham, NC (US);
Ivan M. Heninger, Selma, NC (US);
Douglas A. Larson, Raleigh, NC (US);
Gerald F. McBrearty, Austin, TX (US);
Aaron J. Quirk, Cary, NC (US);
Matthew J. Sheard, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 13/584,964

(22) Filed: Aug. 14, 2012

(65) Prior Publication Data

US 2014/0052945 A1 Feb. 20, 2014

(51) Int. Cl.
*G06F 3/06* (2006.01)
(52) U.S. Cl.
CPC .............. *G06F 3/0608* (2013.01); *G06F 3/061* (2013.01); *G06F 3/067* (2013.01); *G06F 3/0649* (2013.01)
(58) Field of Classification Search
None
See application file for complete search history.

(56) References Cited

U.S. PATENT DOCUMENTS

| | | | | |
|---|---|---|---|---|
| 6,314,503 | B1 * | 11/2001 | D'Errico et al. | 711/173 |
| 7,587,570 | B2 * | 9/2009 | Sarkar et al. | 711/170 |
| 7,899,987 | B2 | 3/2011 | Salomon et al. | |
| 7,949,637 | B1 * | 5/2011 | Burke | 707/655 |
| 8,498,417 | B1 * | 7/2013 | Harwood et al. | 713/193 |
| 8,527,749 | B2 * | 9/2013 | Augenstein et al. | 713/189 |
| 2005/0228950 | A1 * | 10/2005 | Karr | 711/170 |
| 2006/0059172 | A1 | 3/2006 | Devarakonda | |
| 2007/0283119 | A1 * | 12/2007 | Sarkar et al. | 711/170 |
| 2010/0169570 | A1 | 7/2010 | Mesnier et al. | |

OTHER PUBLICATIONS

Mell et al., "The NIST Definition of Cloud Computing," Special Publication 800-145, Sep. 2011.

\* cited by examiner

*Primary Examiner* — Daniel Bernard
(74) *Attorney, Agent, or Firm* — Robert A. Voigt, Jr.; Winstead, P.C.

(57) ABSTRACT

A method, system and computer program product for optimizing storage system behavior in a cloud computing environment. An Input/Output (I/O) operation data is appended with a tag, where the tag indicates a class of data for the I/O operation data. Upon the storage controller reviewing the tag appended to the I/O operation data, the storage controller performs a table look-up for the storage policy associated with the determined class of data. The storage controller applies a map to determine a storage location for the I/O operation data in a drive device, where the map represents a logical volume which indicates a range of block data that is to be excluded for being stored on the drive device and a range of block data that is to be considered for being stored on the drive device. In this manner, granularity of storage policies is provided in a cloud computing environment.

19 Claims, 7 Drawing Sheets

OPTIMIZING STORAGE SYSTEM BEHAVIOR IN VIRTUALIZED CLOUD COMPUTING ENVIRONMENTS BY TAGGING INPUT/OUTPUT OPERATION DATA TO INDICATE STORAGE POLICY

TECHNICAL FIELD

The present invention relates generally to cloud computing, and more particularly to optimizing storage system behavior in virtualized cloud computing environments by tagging input/output operation data to indicate storage policy.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a logical partition of physical resources of the computer. A guest operating system runs on each guest, and the guest appears to the guest operating system as a real computer. Each guest operating system may host one or more virtual machines.

Currently, the cloud computing nodes of the cloud computing environment may be connected to a storage system that includes a combination of Solid-State Drive (SSD) devices and Hard Disk Drive (HDD) devices. The controller of the storage system, commonly referred to as the storage controller, attempts to optimize the storage system by storing the most frequently accessed data in the SSD devices, which have a lower access time and latency than HDD devices but are more expensive. As a result, the storage controller stores infrequently accessed data to the HDD devices. However, such a storage policy prevents having unique data storage policies for particular data storage consumers. That is, there is no granularity of storage processing as consumers all have the same storage system processing policy. As a result, the current storage policy in a cloud computing environment is not an optimal way of storing data.

BRIEF SUMMARY

In one embodiment of the present invention, a method for optimizing storage system behavior in virtualized cloud computing environments comprises reviewing data stored in a logical volume built on a logical storage container. The method further comprises building a map representing the logical volume indicating a range of block data in the logical volume that is to be excluded from being stored on a drive device and a range of block data in the logical volume that is to be considered for being stored on the drive device. Additionally, the method comprises transferring the map to a storage controller. In addition, the method comprises appending, by a processor, an input/output operation data with a tag, where the tag indicates a class of data which is associated with a storage policy. The storage controller applies the storage policy to the input/output operation data. Furthermore, the storage controller applies the map to determine a storage location of the input/output operation data in the drive device.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
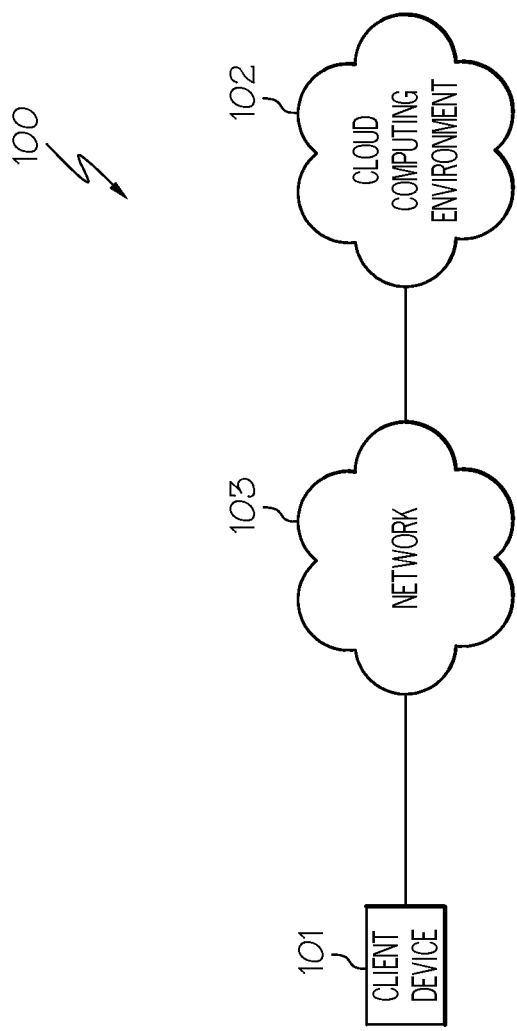
FIG. 1 illustrates a network system configured in accordance with an embodiment of the present invention.

The present invention comprises a method, system and computer program product for optimizing storage system behavior in a virtualized cloud computing environment. In one embodiment, an Input/Output (I/O) operation data is appended with a tag, where the tag indicates a class of data (e.g., swap file data) for the I/O operation data. A table may be used to store storage policies associated with classes of data. Upon the storage controller reviewing the tag appended to the I/O operation data to determine its class of data, the storage controller performs a table look-up for the storage policy associated with the determined class of data. The storage controller applies a map to determine a storage location for the I/O operation data in a drive device, where the map represents a logical volume which indicates a range of block data that is to be excluded for being stored on the drive device and a range of block data that is to be considered for being stored on the drive device. In this manner, granularity of storage policies is provided in a cloud computing environment.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
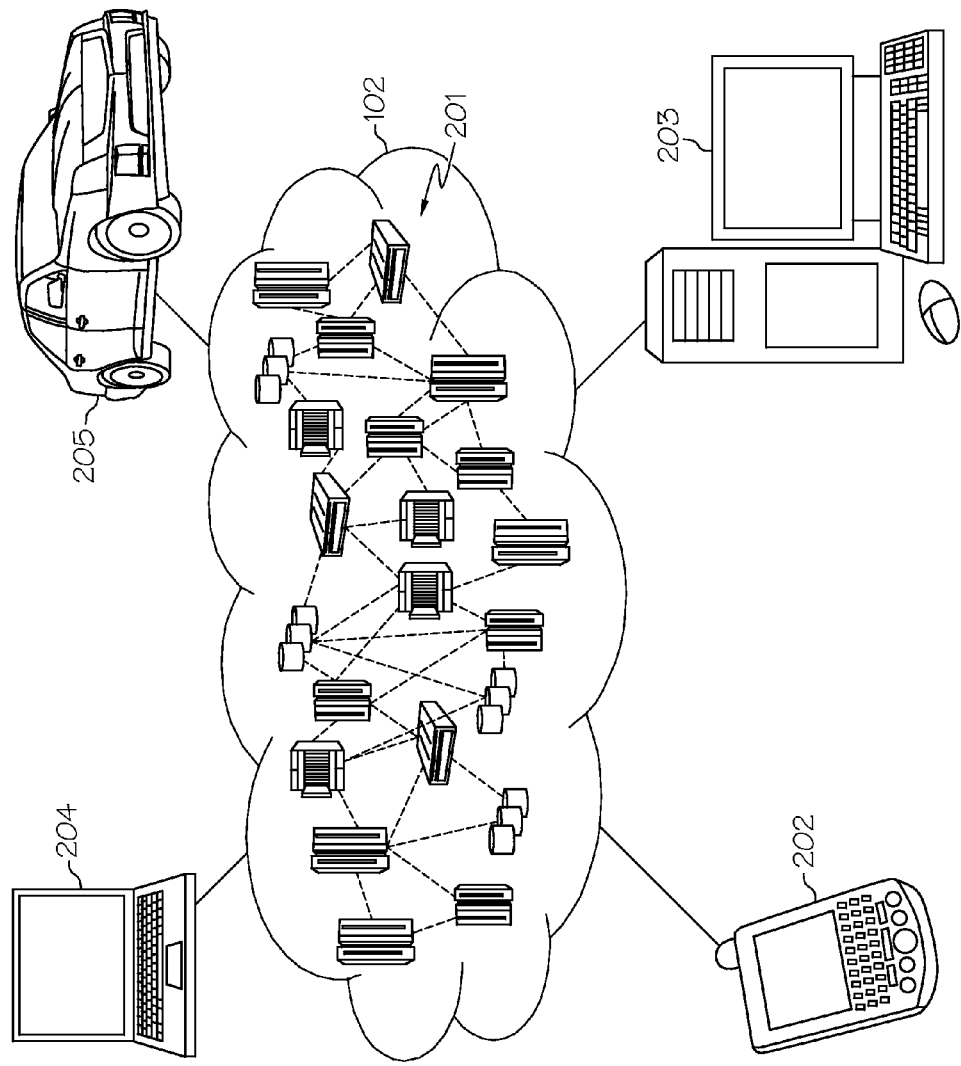
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
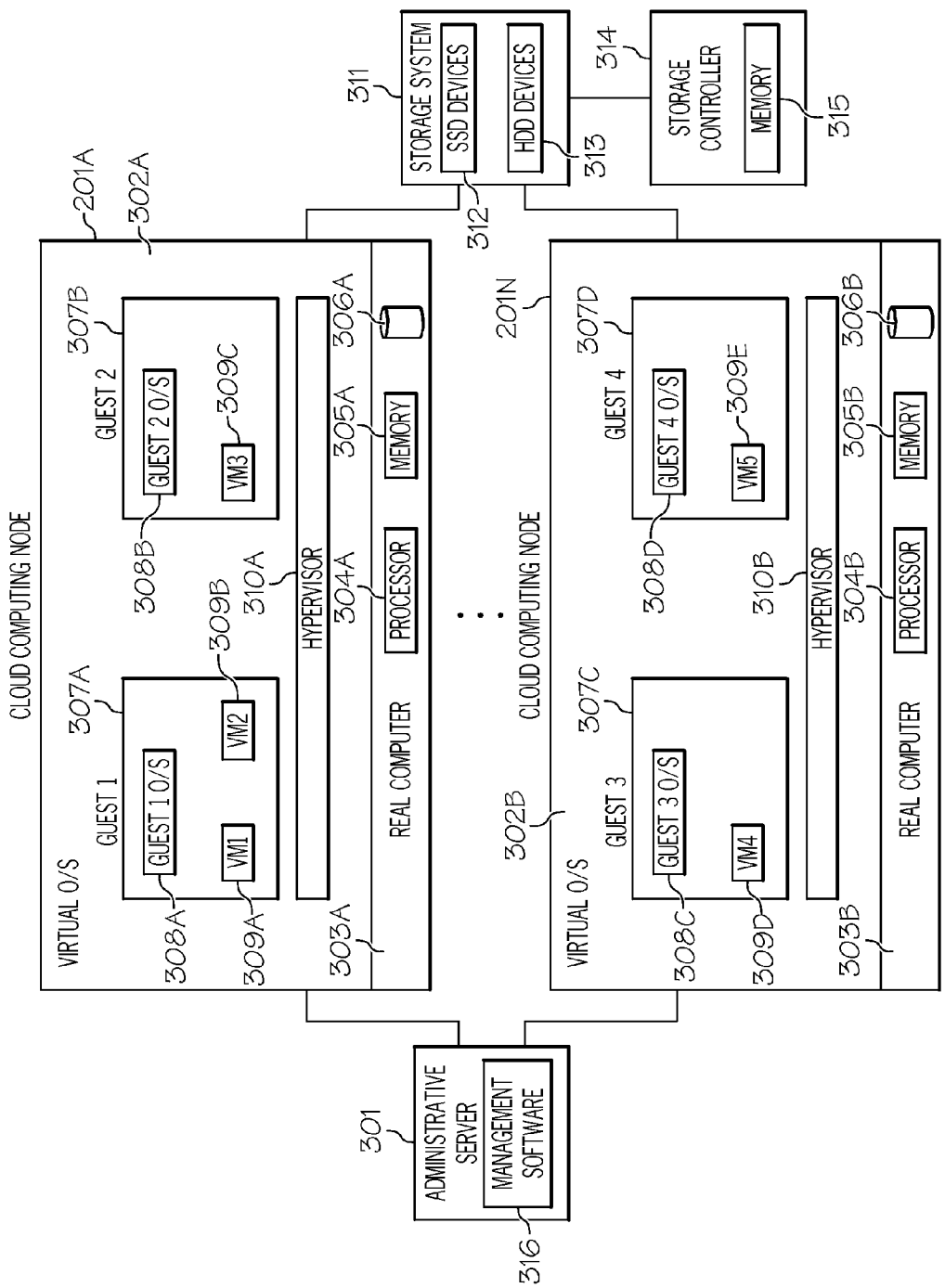
FIG. 3 illustrates a schematic of an exemplary cloud computing node in a virtualized computer environment in accordance with an embodiment of the present invention.

Referring now to FIG. 3, FIG. 3 illustrates cloud computing nodes 201A-N in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-201N are each coupled to an administrative server 301 configured to provide data center-level functions of communicating with hypervisors on cloud computing nodes 201 to install virtual machines, terminate/suspend virtual machines and relocate virtual machines from one cloud computing node 201 to another within the data center.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Virtual operating system 302A further includes user portions 307A-307B (identified as "Guest 1 and Guest 2," respectively, in FIG. 3), referred to herein as "guests." Each guest 307A, 307B is capable of functioning as a separate system. That is, each guest 307A-307B can be independently reset, host a guest operating system 308A-308B, respectively, (identified as "Guest 1 O/S" and "Guest 2 O/S," respectively, in FIG. 3) and operate with different programs. An operating system or application program running in guest 307A, 307B appears to have access to a full and complete system, but in reality, only a portion of it is available.

Each guest operating system 308A, 308B may host one or more virtual machine applications 309A-309C (identified as "VM 1," "VM 2" and "VM 3," respectively, in FIG. 3), such as Java™ virtual machines. For example, guest operating system 308A hosts virtual machine applications 309A-309B. Guest operating system 308B hosts virtual machine application 309C.

Virtual operating system 302A further includes a common base portion 310A, referred to herein as a hypervisor. Hypervisor 310A may be implemented in microcode running on processor 304A or it may be implemented in software as part of virtual operating system 302A. Hypervisor 310A is configured to manage and enable guests 307A, 307B to run on a single host.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud computing node 201A. Cloud computing node 201N includes the same elements as cloud computing node 201A. For example, guests 307C-307D (identified as "Guest 3 and Guest 4," respectively, in FIG. 3) are functionally the same as guests 307A-307B. Similarly, guest operating systems 308C-308D (identified as "Guest 3 O/S" and "Guest 4 O/S," respectively, in FIG. 3) are functionally the same as guest operating systems 308A-308B. Virtual machines 309D-309E (identified as "VM 4" and "VM 5," respectively, in FIG. 3) are functionally the same as virtual machines 309A-309C. Furthermore, hypervisor 310B is functionally the same as hypervisor 310A. Hence, the discussion of cloud computing node 201A applies to each cloud computing node 201, including cloud computing node 201N. In one embodiment, each cloud computing node 201 can be configured differently and the physical hardware, hypervisors and other components may be different as well.

Guests 307A-307D may collectively or individually be referred to as guests 307 or guest 307, respectively. Guest operating systems 308A-308D may collectively or individually be referred to as guest operating systems 308 or guest operating system 308, respectively. Virtual machines 309A-309E may collectively or individually be referred to as virtual machines 309 or virtual machine 309, respectively. Hypervisors 310A-310B may collectively or individually be referred to as hypervisors 310 or hypervisor 310, respectively.

FIG. 3 is not to be limited in scope to a particular number of cloud computing nodes 201 and each cloud computing node 201 may include any number of guests 307, guest operating systems 308, virtual machines 309, etc. Furthermore, cloud computing nodes 201 include other components that were not discussed herein for the sake of brevity. Hence, cloud computing node 201 is not to be limited in scope to the elements depicted in FIG. 3.

In one embodiment, cloud computing nodes 201 are connected to a storage system 311 which includes various drive devices, such as Solid-State Drive (SSD) devices 312 and Hard Disk Drive (HDD) devices 313. The storing of data in storage system 311 is controlled by a storage controller 314. In one embodiment, storage controller 314 includes memory 315 for storing a table that includes a listing of classes of data and associated storage policies. For example, the class of data of "swap file data" may be associated with the storage policy of being "excluded from SSD devices 312."

Referring again to FIG. 3, in some embodiments, administrative server 301 supports a module, referred to herein as the management software 316, that can be used to manage all the hardware components of cloud computing nodes 201, monitor system utilization, intelligently deploy images of data and optimize the operations of cloud computing environment 102. Furthermore, management software 316 can be used to optimize storage system behavior in cloud computing environment 102 as discussed further below in connection with FIGS. 5-7. A description of the hardware configuration of administrative server 301 is provided further below in connection with FIG. 4.

Figure 4:
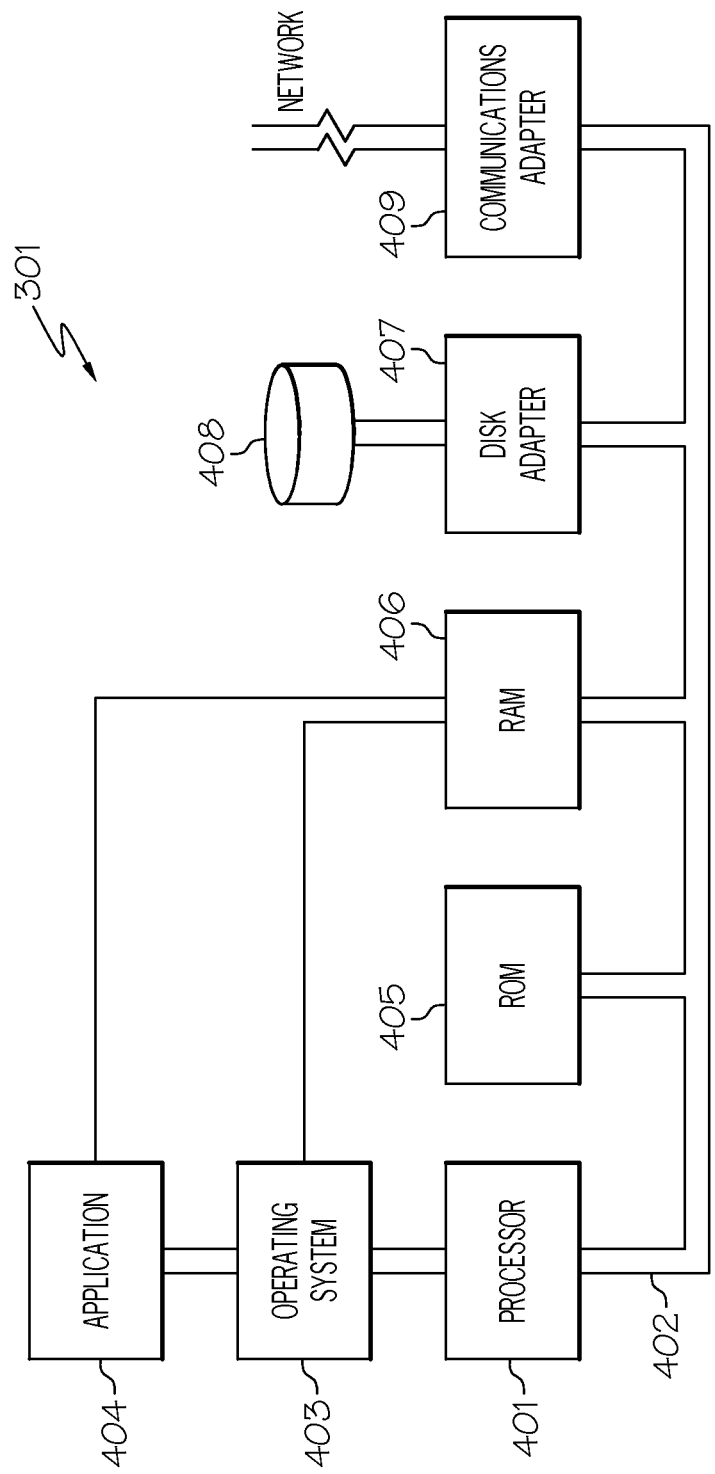
FIG. 4 illustrates a hardware configuration of an administrative server configured in accordance with an embodiment of the present invention.

Referring now to FIG. 4, FIG. 4 illustrates a hardware configuration of administrative server 301 (FIG. 4) which is representative of a hardware environment for practicing the present invention. Administrative server 301 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program (e.g., management software 316) for optimizing storage system behavior in cloud computing environment 102 (FIGS. 1 and 2) as discussed further below in association with FIGS. 5-7.

Referring again to FIG. 4, read-only memory ("ROM") 405 is coupled to system bus 402 and includes a basic input/output system ("BIOS") that controls certain basic functions of administrative serer 301. Random access memory ("RAM") 406 and disk adapter 407 are also coupled to system bus 402. It should be noted that software components including operating system 403 and application 404 may be loaded into RAM 406, which may be administrative server's 301 main memory for execution. Disk adapter 407 may be an integrated drive electronics ("IDE") adapter that communicates with a disk unit 408, e.g., disk drive. It is noted that the program for optimizing storage system behavior in cloud computing environment 102, as discussed further below in connection with FIGS. 5-7, may reside in disk unit 408 or in application 404.

Administrative server 301 may further include a communications adapter 409 coupled to bus 402. Communications adapter 409 interconnects bus 402 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, in a cloud computing environment, a storage system includes a combination of Solid-State Drive (SSD) devices and Hard Disk Drive (HDD) devices. The controller of the storage system, commonly referred to as the storage controller, attempts to optimize the storage system by storing the most frequently accessed data in the SSD devices, which have a lower access time and latency than HDD devices but are more expensive. As a result, the storage controller stores infrequently accessed data to the HDD devices. However, such a storage policy prevents having unique data storage policies for particular data storage consumers. That is, there is no granularity of storage processing as consumers all have the same storage system processing policy. As a result, the current storage policy in a cloud computing environment is not an optimal way of storing data.

Figure 5:
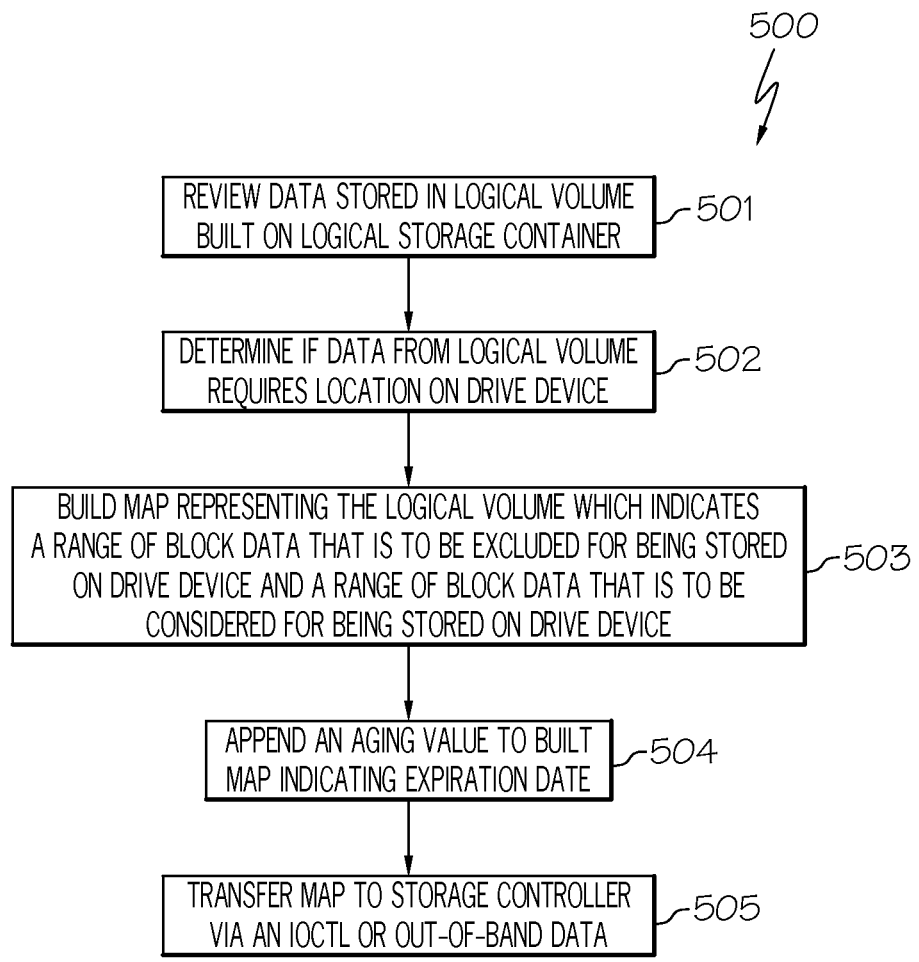
FIG. 5 is a flowchart of a method for appropriately representing a logical volume across one or more drive devices in accordance with an embodiment of the present invention.
Figure 6:
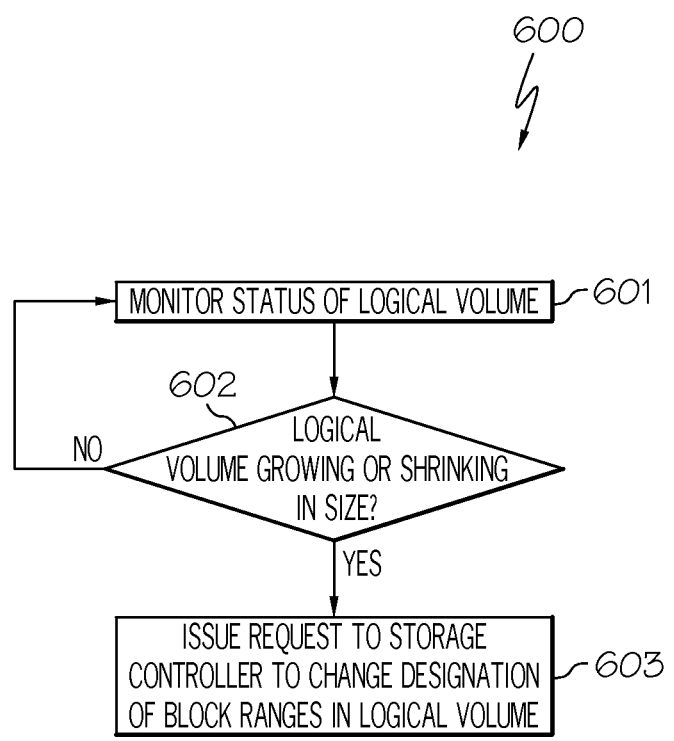
FIG. 6 is a flowchart of a method for updating the designation of the block ranges in the logical volume in accordance with an embodiment of the present invention.
Figure 7:
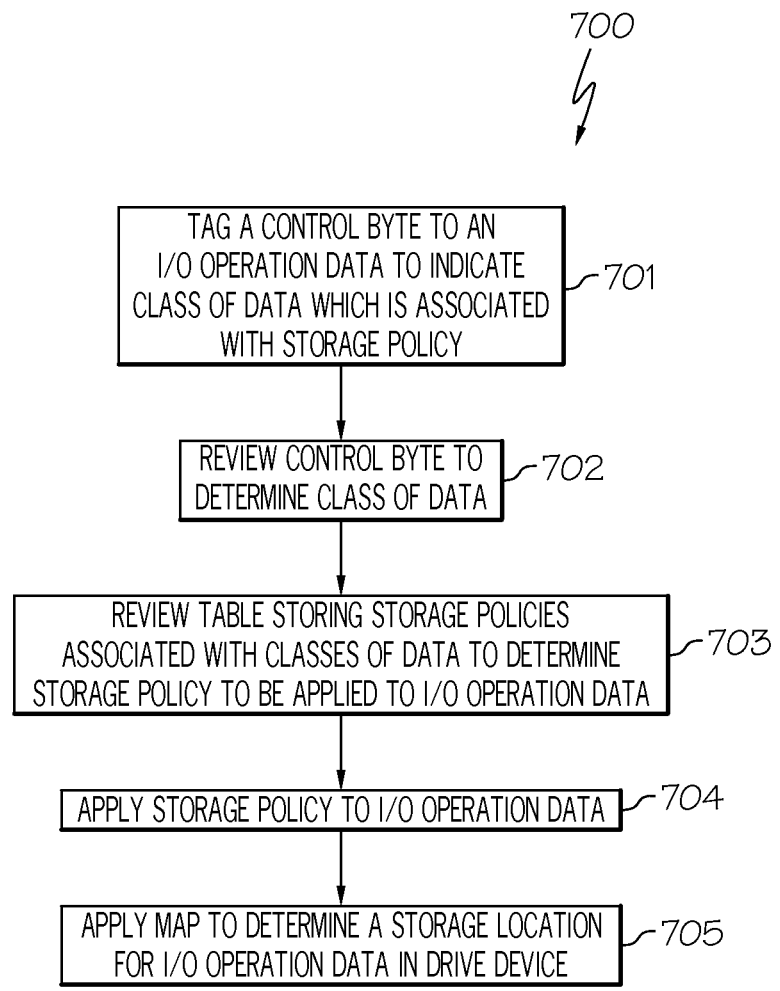
FIG. 7 is a flowchart of a method for invoking the appropriate storage policy through the use of a tagging operation in accordance with an embodiment of the present invention.

The principles of the present invention provide a means for providing granularity of storage policies in a cloud computing environment via an input/output operation data tagging mechanism as discussed below in connection with FIGS. 5-7. FIG. 5 is a flowchart of a method for appropriately representing a logical volume across one or more drive devices (e.g., SSD devices 312, HDD devices 313). FIG. 6 is a flowchart of a method for updating the designation of the block ranges in the logical volume. FIG. 7 is a flowchart of a method for invoking the appropriate storage policy through the use of a tagging operation.

As stated above, FIG. 5 is a flowchart of a method 500 for appropriately representing a logical volume across one or more drive devices (e.g., SSD devices 312, HDD devices 313) in accordance with an embodiment of the present invention.

Referring now to FIG. 5, in conjunction with FIGS. 1-4, in step 501, administrative server 301 reviews data stored in a logical volume that is built on a logical storage container that may span across one or more drive devices, such as SSD devices 312, HDD devices 313.

In step 502, administrative server 301 determines if the data from the logical volume requires location on a particular drive device, such as SSD device 312.

In step 503, administrative server 301 builds a map representing the logical volume which indicates a range of bock data that is to be excluded from being stored on the drive device, such as SSD device 312, and a range of block data that is to be considered for being stored on the drive device, such as SSD device 312.

In step 504, administrative server 301 appends an aging value to the built map which indicates an expiration date. For example, a map may indicate that a block of data is used to store data in SSD device 312. After the map has been expired, data may be safely migrated out of SSD device 312 from the standpoint of the application using the data.

In step 505, administrative server 301 transfers the map to storage controller 314 via an input/output control (IOCTL) system call or via out-of-band data (communications which occur outside of a previously established communication method or channel). As will be discussed in connection with FIG. 7, the map provides guidance to storage controller 314 as to where to store data (e.g., input/output operation data) in the drive device.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

As discussed above, the map of the logical volume indicates a range of bock data that is to be excluded from being stored on the drive device, such as SSD device 312, and a range of block data that is to be considered for being stored on the drive device, such as SSD device 312. However, such block ranges may have to be modified in light of changes to the logical volume, such as growing or shrinking in size. A method for updating the designation of the block ranges in the logical volume is discussed below in connection with FIG. 6.

FIG. 6 is a flowchart of a method 600 for updating the designation of the block ranges in the logical volume in accordance with an embodiment of the present invention.

Referring to FIG. 6, in conjunction with FIGS. 1-4, in step 601, administrative server 301 monitors the status of the logical volume.

In step 602, a determination is made by administrative server 301 as to whether the logical volume is growing or shrinking in size.

If the size of the logical volume has changed (i.e., grew or shrunk in size), then, in step 603, administrative server 301 issues a request to storage controller 314 to change the designations of the block ranges in the logical volume so that the data in these block ranges are mapped appropriately.

If, however, the size of the logical volume has not changed, then administrative server 301 continues to monitor the status of the logical volume in step 601.

In some implementations, method 600 may include other and/or additional steps that, for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

As discussed above, the granularity of storage policies may be provided in a cloud computing environment via an input/output operation data tagging mechanism as discussed below in connection with FIG. 7.

FIG. 7 is a flowchart of a method 700 for invoking the appropriate storage policy through the use of a tagging operation in accordance with an embodiment of the present invention.

Referring to FIG. 7, in conjunction with FIGS. 1-4, in step 701, administrative server 301 tags or appends a control byte (the "tag") to an Input/Output (I/O) operation data to indicate a class of data which is associated with a storage policy. For example, one such class of data may be swap file data. A swap file allows an operating system to use hard disk space to stimulate extra memory. For example, when the system runs low on memory, it swaps a section of RAM that an idle program is using onto the hard disk to free up memory for other programs. Then, when the user goes back to the swapped out program, it changes places with another program in RAM. In the past in the context of the cloud computing environment 102, storage controller 314 may store swap file data on SSD device 312 in response to the swap file data being accessed frequently. However, as a result of storing the swap file data on SSD device 312, the swap file data displaces the application data thereby increasing the application transaction latency and memory usage. Since all virtual machines 309 are sharing storage system 311, all virtual machines 309 would experience an increase in data access times and memory usage. As a result, it may be desirable to exclude the swap file content from being stored on SSD device 312. The swap file data may be excluded from being stored on SSD device 312 as discussed below.

In step 702, storage controller 314 reviews the I/O operation data, including the control byte ("tag"), to determine the class of data. In one embodiment, a table may store storage policies associated with classes of data. For example, the table may indicate the data class of "swap file" with a storage policy of being "excluded from SSD devices 312." In another example, the table may indicate the data class of "temporary data with an expected lifetime of X ms" with a storage policy of being "excluded from HDD devices 313." In one embodiment, the table is stored in memory 315 or a cache (not shown in Figures) of storage controller 314.

In step 703, storage controller 314 reviews the table storing the storage policies associated with classes of data to determine the storage policy to be applied to the I/O operation data. That is, storage controller 314 performs a table look-up for the storage policy associated with the class of data identified in step 702.

In step 704, storage controller 314 applies the appropriate storage policy to the I/O operation data. For example, if the I/O operation data included customer data, and the storage policy associated with customer data is that such data should be considered for storage on SSD device 312, then it will be considered for storage on SSD device 312.

In step 705, storage controller 314 applies the map (map it received in step 505 of FIG. 5) to determine an appropriate storage location in the drive device (e.g., SSD device 312).

In some implementations, method 700 may include other and/or additional steps that, for clarity, are not depicted. Further, in some implementations, method 700 may be executed in a different order presented and that the order presented in the discussion of FIG. 7 is illustrative. Additionally, in some implementations, certain steps in method 700 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for optimizing storage system behavior in virtualized cloud computing environments, the method comprising:
   reviewing data stored in a logical volume built on a logical storage container;
   building a map representing said logical volume indicating a range of block data in said logical volume that is to be excluded from being stored on a drive device and a range of block data in said logical volume that is to be considered for being stored on said drive device;
   transferring said map to a storage controller; and
   appending, by a processor, an input/output operation customer data with a tag, wherein said tag indicates a class of data which is associated with a storage policy in a cloud computing environment, wherein said storage controller applies said storage policy to said input/output operation customer data, wherein said storage controller applies said map to determine a storage location of said input/output operation customer data in said drive device.

2. The method as recited in claim 1 further comprising:
   appending a value to said map indicating an expiration date.

3. The method as recited in claim 1, wherein said map is transferred to said storage controller via an input/output control system call or via an out-of-band data.

4. The method as recited in claim 1 further comprising:
   reviewing said tag to determine said class of data; and
   reviewing a table storing storage policies associated with classes of data to determine said storage policy associated with said tag.

5. The method as recited in claim 1 further comprising:
   monitoring a status of said logical volume; and
   issuing a request to said storage controller to change designation of block ranges in said logical volume in response to said logical volume growing or shrinking in size.

6. The method as recited in claim 1, wherein said drive device is a solid-state drive device.

7. The method as recited in claim 1, wherein said drive device is a hard disk drive device.

8. A computer program product embodied in a non-transitory computer readable storage medium for optimizing storage system behavior in virtualized cloud computing environments, the computer program product comprising the programming instructions for:
   reviewing data stored in a logical volume built on a logical storage container;
   building a map representing said logical volume indicating a range of block data in said logical volume that is to be excluded from being stored on a drive device and a range of block data in said logical volume that is to be considered for being stored on said drive device;
   transferring said map to a storage controller; and
   appending an input/output operation customer data with a tag, wherein said tag indicates a class of data which is associated with a storage policy in a cloud computing environment, wherein said storage controller applies said storage policy to said input/output operation customer data, wherein said storage controller applies said map to determine a storage location of said input/output operation customer data in said drive device.

9. The computer program product as recited in claim 8 further comprising the programming instructions for:
   appending a value to said map indicating an expiration date.

10. The computer program product as recited in claim 8, wherein said map is transferred to said storage controller via an input/output control system call or via an out-of-band data.

11. The computer program product as recited in claim 8 further comprising the programming instructions for:
   monitoring a status of said logical volume; and
   issuing a request to said storage controller to change designation of block ranges in said logical volume in response to said logical volume growing or shrinking in size.

12. The computer program product as recited in claim 8, wherein said drive device is a solid-state drive device.

13. The computer program product as recited in claim 8, wherein said drive device is a hard disk drive device.

14. A system, comprising:
- a memory unit for storing a computer program for optimizing storage system behavior in virtualized cloud computing environments; and
- a processor coupled to said memory unit, wherein said processor, responsive to said computer program, comprises:
  - circuitry for reviewing data stored in a logical volume built on a logical storage container;
  - circuitry for building a map representing said logical volume indicating a range of block data in said logical volume that is to be excluded from being stored on a drive device and a range of block data in said logical volume that is to be considered for being stored on said drive device;
  - circuitry for transferring said map to a storage controller; and
  - circuitry for appending an input/output operation customer data with a tag, wherein said tag indicates a class of data which is associated with a storage policy in a cloud computing environment, wherein said storage controller applies said storage policy to said input/output operation customer data, wherein said storage controller applies said map to determine a storage location of said input/output operation customer data in said drive device.

15. The system as recited in claim 14, wherein said processor further comprises:
- circuitry for appending a value to said map indicating an expiration date.

16. The system as recited in claim 14, wherein said map is transferred to said storage controller via an input/output control system call or via an out-of-band data.

17. The system as recited in claim 14, wherein said processor further comprises:
- circuitry for monitoring a status of said logical volume; and
- circuitry for issuing a request to said storage controller to change designation of block ranges in said logical volume in response to said logical volume growing or shrinking in size.

18. The system as recited in claim 14, wherein said drive device is a solid-state drive device.

19. The system as recited in claim 14, wherein said drive device is a hard disk drive device.

* * * * *